United States Patent
Sanchez Lopez

(10) Patent No.: US 12,498,016 B2
(45) Date of Patent: Dec. 16, 2025

(54) WIRE LOOP HOIST POINT ANCHOR

(71) Applicant: Hilti Aktiengesellschaft, Schaan (LI)

(72) Inventor: Marco Sanchez Lopez, St Gallen (CH)

(73) Assignee: Hilti Aktiengesellschaft, Schaan (LI)

( * ) Notice: Subject to any disclaimer, the term of this patent is extended or adjusted under 35 U.S.C. 154(b) by 1005 days.

(21) Appl. No.: 17/628,033

(22) PCT Filed: Jul. 9, 2020

(86) PCT No.: PCT/EP2020/069410
§ 371 (c)(1),
(2) Date: Jan. 18, 2022

(87) PCT Pub. No.: WO2021/009005
PCT Pub. Date: Jan. 21, 2021

(65) Prior Publication Data
US 2022/0275851 A1    Sep. 1, 2022

(30) Foreign Application Priority Data
Jul. 18, 2019    (EP) ..................................... 19186877

(51) Int. Cl.
*F16G 11/02* (2006.01)
*F16G 11/14* (2006.01)

(52) U.S. Cl.
CPC ............. *F16G 11/02* (2013.01); *F16G 11/14* (2013.01)

(58) Field of Classification Search
CPC .. B66C 1/66; B66C 1/666; B66C 1/16; B66C 13/06; F16G 11/02; F16G 11/14
USPC ...................... 294/89, 215; 52/125.2; 403/78
See application file for complete search history.

(56) References Cited

U.S. PATENT DOCUMENTS

| | | | |
|---|---|---|---|
| 434,603 A * | 8/1890 | Markham | |
| 4,323,273 A * | 4/1982 | Sword | F16G 11/10 403/353 |
| 5,052,869 A * | 10/1991 | Hansen | B60P 7/0807 410/101 |
| 5,630,634 A * | 5/1997 | Stowe | H01F 7/206 335/291 |
| 5,774,948 A * | 7/1998 | Petschke | B60P 7/0807 24/265 AL |
| 7,651,305 B1 * | 1/2010 | Boyd | B61D 45/001 410/111 |
| 8,251,410 B1 * | 8/2012 | Carter | F41H 7/042 292/DIG. 31 |
| 8,424,638 B1 * | 4/2013 | Guthrie | E04G 21/3276 248/499 |

(Continued)

FOREIGN PATENT DOCUMENTS

EP       2 324 701 A1    5/2011

OTHER PUBLICATIONS

PCT/EP2020/069410, International Search Report dated Oct. 19, 2020 (Two (2) pages).

*Primary Examiner* — Paul T Chin
(74) *Attorney, Agent, or Firm* — Crowell & Moring LLP

(57) ABSTRACT

A hoist point anchor includes a base where the base has a contact surface for contacting a flat ceiling and where the base has a plurality of anchor holes emerging at the contact surface for receiving a plurality of respective anchor bolts for anchoring the base to the flat ceiling. A wire rope forms a wire rope loop for attaching a hook where the wire rope loop is attached to the base. The base passes through the wire rope loop.

10 Claims, 2 Drawing Sheets

(56) References Cited

U.S. PATENT DOCUMENTS

| | | | |
|---|---|---|---|
| 10,036,416 B2 * | 7/2018 | Moreau | A45F 5/021 |
| 11,879,256 B1 * | 1/2024 | King | A62B 35/0043 |
| D1,064,612 S * | 3/2025 | Wang | |
| 12,280,624 B2 * | 4/2025 | Riddle | B60D 1/565 |

* cited by examiner

WIRE LOOP HOIST POINT ANCHOR

BACKGROUND AND SUMMARY OF THE INVENTION

The invention relates to a hoist point anchor. Such a hoist point anchor comprises a base, wherein the base has a contact surface for contacting a flat ceiling and wherein the base has a plurality of anchor holes, emerging at the contact surface, for receiving anchor bolts for anchoring the base to the ceiling, and a wire rope forming a wire rope loop for attaching a hook, wherein the wire rope loop is attached to the base.

When work is to be carried out in elevator shafts, hoist point anchors might be required. These anchors are mounted to the ceiling of the elevator shaft and provide an eye, on which hoisting equipment might be suspended.

At https://www.stinglonline.de/en/anchor-point.html, a hoist point anchor is described that comprises a piece of wire rope, both ends of which are fixed within a single sleeve, so that the wire rope forms an eye. The sleeve projects radially from a baseplate, which is intended to be anchored to the ceiling of a shaft.

Another hoist point anchor, named "HAP 1.15", is disclosed at https://www.hilti.com/c/CLS_FASTENER_7135/CLS_CASTIN_ANCHOR_CHANNELS_7 135/CLS_ACCESSORIES_FOR_ELEVATORS_7135/2032179. This anchor comprises a baseplate to be anchored to the ceiling, a trunnion projecting from the baseplate, and a shackle attached to the trunnion.

EP2324701 A1 describes a collar for fastening one or more wire-like elements on a pole of a row of plants.

It is an object of the invention to provide a hoist point anchor which has, while being easy to manufacture, particularly good load performance and particularly high versatility.

According to the invention, the base passes through the wire rope loop.

Thus, the wire rope loop winds around a dedicated section of the base, i.e., the base pierces through the wire rope loop. This permits a particularly compact design. In particular, the overall height of the anchor, more particular the overall height of the rigid parts of the anchor, can be particularly low, since the interlaced arrangement of the wire rope and the base allows to locate the mechanical connection between the wire rope and the base within the base, without a need for protruding fittings. The low overall height of the anchor can provide particularly high versatility, and especially, it can provide particularly high headroom in elevator shafts. Moreover, the interlaced design can provide a particularly efficient force transfer between base and wire rope, thereby providing particularly good load performance.

The contact surface is for contacting a ceiling, i.e., a horizontal surface that forms the top part inside a room, in particular inside an elevator shaft. The contact surface is for contacting a flat, i.e., a non-curved, ceiling. Thus, the contact surface is preferably also flat. As described in more detail below, the contact surface could also be a discontinuous surface, consisting of a plurality of separate sub-surfaces, all of which are advantageously flat. The contact surface forms a face of the hoist point anchor. The contact surface can have one or more of recesses, e.g., for housing the wire loop and its fittings or for saving material. In particular, the base can have a ribbing, with the contact surface provided on the ribbing. Each anchor hole allows passing an anchor through the base into the ceiling, for anchoring the base to the ceiling.

The anchor holes emerge at the contact surface, i.e., they project from the contact surface into the base. In particular, each of the anchor holes can be aligned perpendicular to the contact surface. The anchor holes are suitable for receiving the anchor bolts for anchoring the base to the ceiling when the contact surface contacts the flat ceiling, i.e., in a state in which the contact surface is in contact with the ceiling.

In particular, the wire rope can comprise a plurality of strands of metal wire twisted into a helix, thereby forming a composite rope structure. The wire rope can preferably be a steel wire rope. The wire rope loop forms an eye, into which a hook can be hooked. The wire rope loop is attached, i.e., connected, to the base, in particular at both opposite end regions of the wire rope loop, so that the wire rope loop can transfer tensile forces from a hook hooked into the wire rope loop into the base.

The wire rope has a first end region and, opposite the first end region, a second end region.

Preferentially, the first end region of the wire rope is arranged parallel to the contact surface and/or the second end region of the wire rope is arranged parallel to the contact surface. This can further reduce the overall height of the anchor.

Mechanical connection of the ends of the wire rope to the base could be achieved by numerous fitting arrangements. It is, however, particularly preferred that the hoist point anchor comprises a first ferrule and a second ferrule, wherein the first ferrule surrounds and is fixed to the wire rope in its first end region, wherein the second ferrule surrounds and is fixed to the wire rope in its second end region, and wherein the base engages the first ferrule and the second ferrule. Accordingly, two separate ferrules are used for fixing the respective end regions of the wire rope. This provides a comparatively high degree of geometric design freedom, which can, amongst others, be advantageous in view of anchor size. Engagement of the ferrules by the base is preferably achieved by stop holes provided within the base, which are made of a size to pass the wire rope, but not wide enough to permit the respective ferrule to be drawn through it. Preferably, the stop holes are provided in fork structures provided on the base. In this case, the stop holes are laterally open for inserting the wire rope.

Preferentially, the first ferrule and the second ferrule have parallel longitudinal axes. This can be advantageous in view of anchor size. The axes of the ferrules extend through the opening of the respective ferrule, in the longitudinal direction of the respective ferrule.

According to another preferred embodiment of the invention, the base comprises a node portion and a plurality of mounting arms projecting from the node portion, wherein at least one anchor hole is provided in each of the mounting arms. This allows reducing the amount of required material without significantly compromising on mechanical properties. Preferably, the base comprises four mounting arms, arranged to form a cross. The base can have supplementary arms without a mounting hole, for example for stabilizing purposes.

Advantageously, it is the node portion of the base which passes through the wire rope loop. This can allow particular efficient force transfer between the wire rope loop and the base, further reducing the amount of required material without significantly compromising on mechanical properties.

The contact surface may preferably be located on the mounting arms, in particularly on the mounting arms only. In this case, the contact surface could be a discontinuous surface, consisting of a plurality of separate sub-surfaces, wherein one of the sub-surfaces is located on each mounting arm. Having the contact surface at the mounting arms can be advantageous, amongst others, in view of device stability, robustness and size.

The base can comprise, preferably two, thimble grooves that guide the wire rope loop. The wire rope is disposed in the thimble grooves so that the walls of the thimble grooves delimit deflection of the wire rope loop. Thimble grooves can thus form an integrated thimble in the base.

The base can preferably be monolithic, i.e., consist of one piece. This can be advantageous in view of robustness. In particular, the base can consist of metal, preferably cast metal, which can also be coated with other materials or have inlays consisting of other materials.

The invention also relates to a building structure comprising a ceiling and the described hoist point anchor fixed to the ceiling by anchor bolts passing through the anchor holes, so that the contact surface of the base of the hoist point anchor faces the ceiling. Thus, the hoist point anchor is mounted as intended. In particular, the contact surface of the base touches the ceiling.

Features that are described here in connection with the inventive hoist point anchor can also be used in connection with the inventive building structure and features that are described here in connection with the inventive building structure can also be used in connection with the inventive hoist point anchor.

The invention is explained in greater detail below with reference to preferred exemplary embodiments, which are depicted schematically in the accompanying drawings, wherein individual features of the exemplary embodiments presented below can be implemented either individually or in any combination within the scope of the present invention.

DETAILED DESCRIPTION OF THE DRAWINGS

Figure 1:
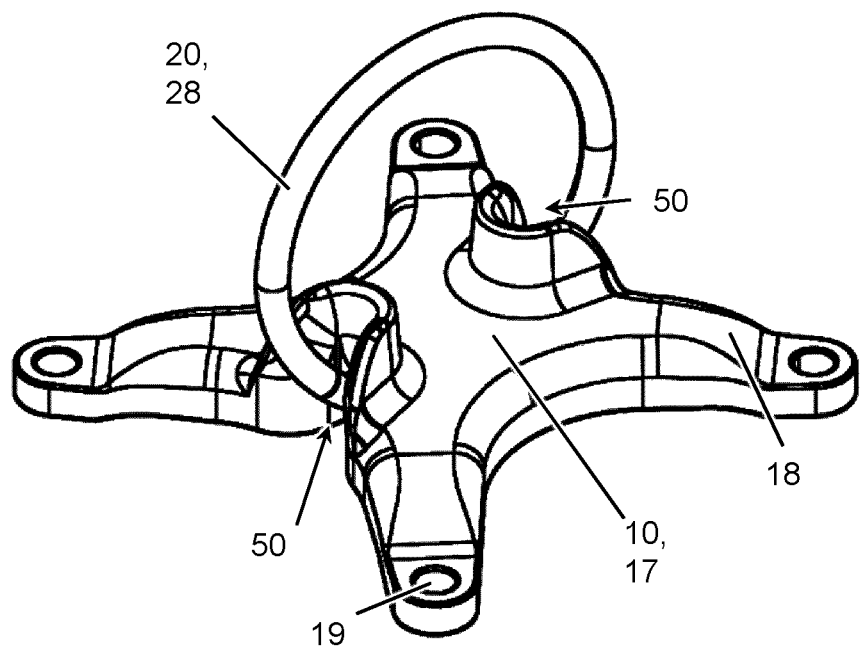
FIG. 1 is an isometric view of a hoist point anchor.
Figure 2:
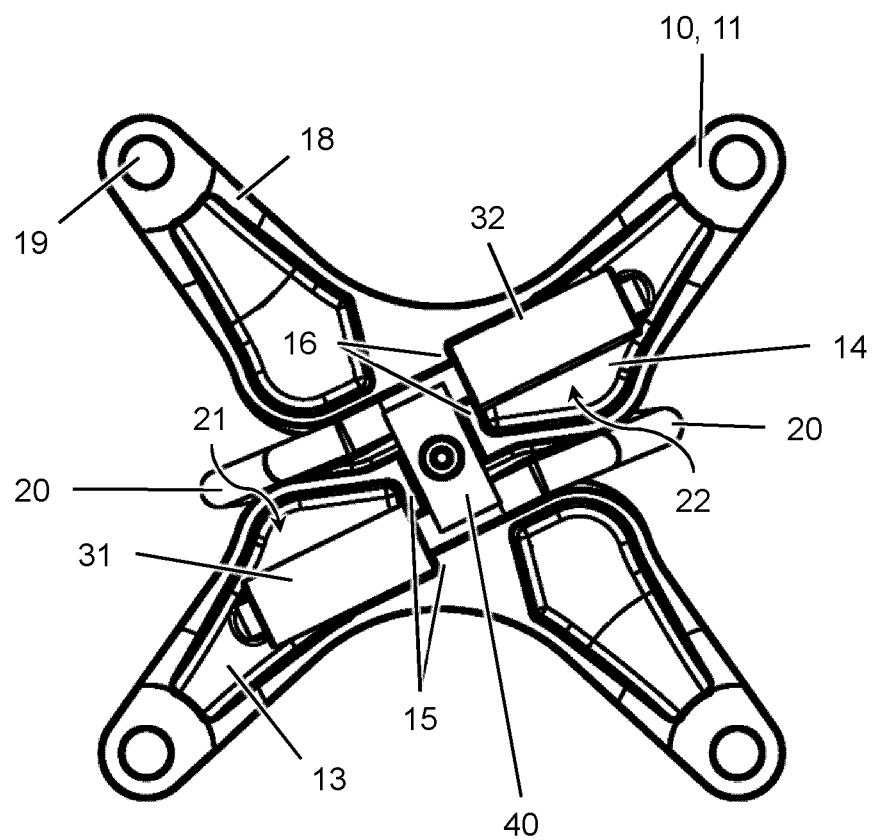
FIG. 2 is a top view of the hoist point anchor of FIG. 1.
Figure 3:
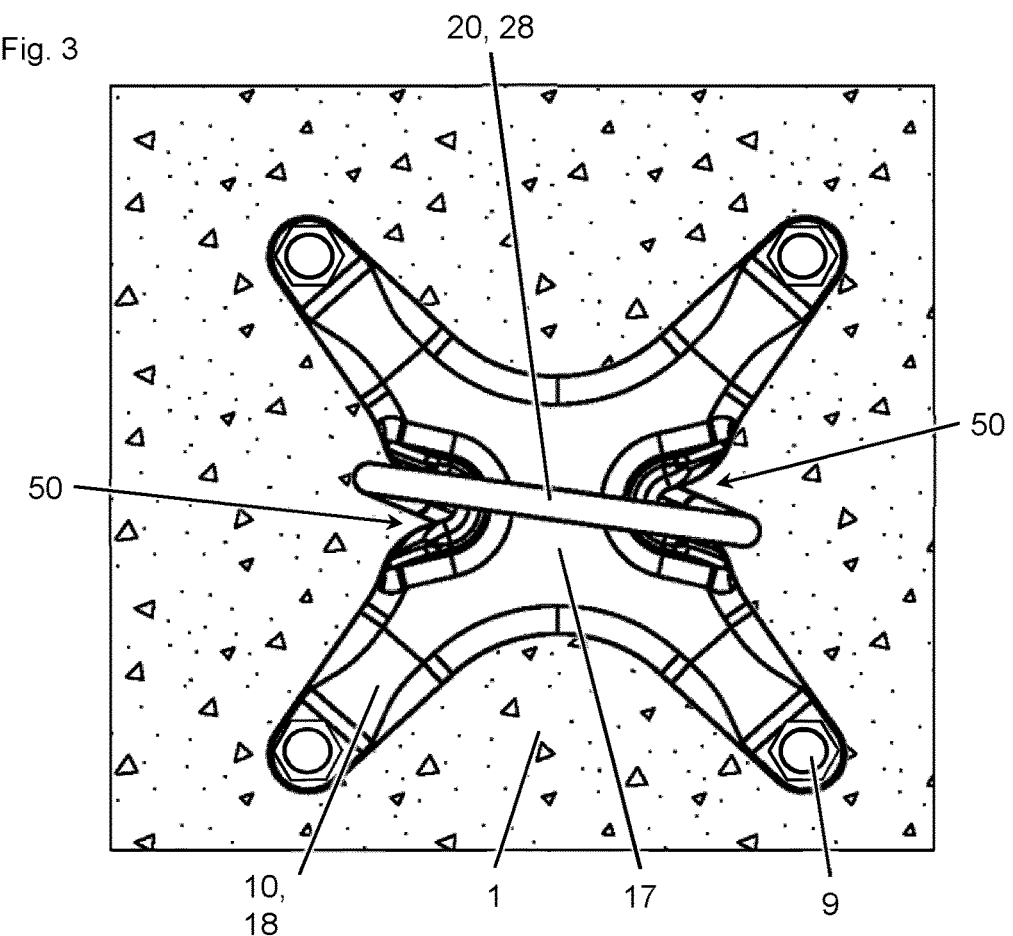
FIG. 3 is bottom view of the hoist point anchor of FIG. 1 and of a ceiling to which the hoist point anchor is anchored through anchor bolts.
Figure 4:
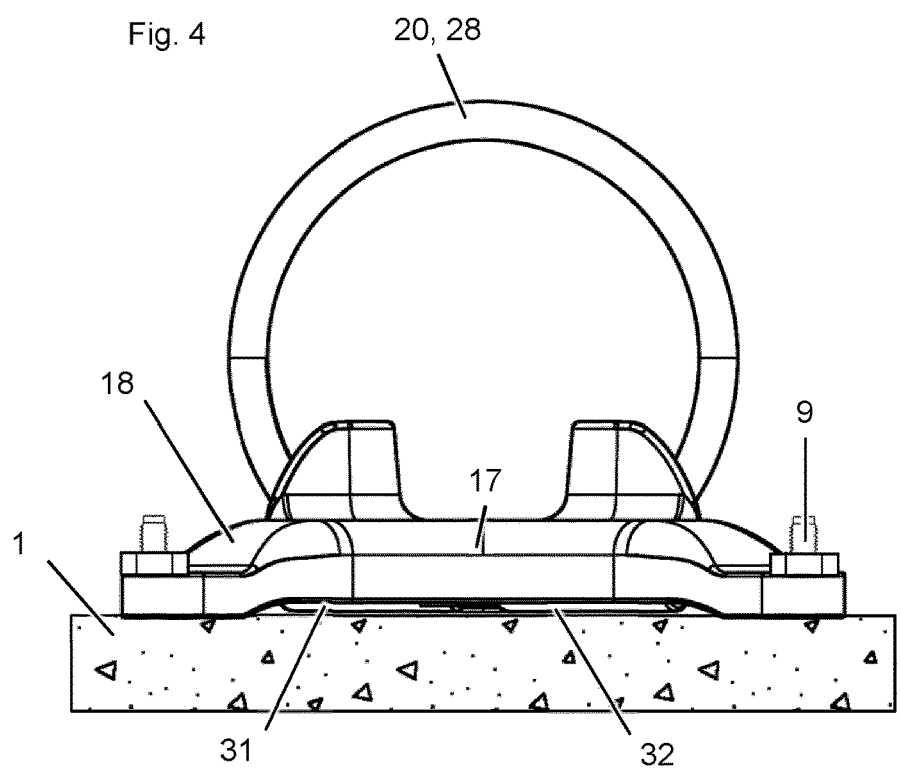
FIG. 4 is side view of the hoist point anchor of FIG. 1 and of a ceiling to which the hoist point anchor is anchored through anchor bolts.

The figures show an example of an inventive hoist point anchor. The hoist point anchor comprises a cruciform base 10 comprising a node portion 17 and four mounting arms 18, each of which projects from the node portion 17. The base 10 has a flat contact surface 11 intended to be placed adjacent to a flat ceiling 1. The contact surface 11 consists of four separate sub-surfaces, wherein one of these sub-surfaces is arranged on each mounting arm 18. In each of the mounting arms 18, in particular in an end portion of the respective mounting arm remote from the node portion 17, is provided a through anchor hole 19. The anchor holes 19 are intended to receive anchor bolts 9 for anchoring the base 10 to the ceiling 1. Each anchor hole 19 originates from and is surrounded by a sub-surface of the contact surface 11. Thus, the contact surface 11 is located remote from the node portion 17.

The base 10 preferably consists of cast metal, which might additionally be coated. In particular, the base 10 is monolithic.

The hoist point anchor moreover comprises a wire rope 20 having a first end region 21 and a second end region 22. The wire rope 20 is disposed in the form of a wire rope loop 28, which is wrapped around the base 10, in particular around its node portion 17, i.e., the base 10, in particular its node portion 17, passes through the wire rope loop 28. The wire rope loop 28 has a slack portion, which projects from the base 10 at the underside of the base 10, i.e., at the side of the base 10 opposite the contact surface 11, and this slack portion forms an eye for attaching a hook. In the present embodiment, the legs of the wire rope loop 28 (i.e., the end regions 21 and 22 of the wire rope 20) overlap in side view along the axis of the wire rope loop 28, but this is an example only.

The first end region 21 of the wire rope 20 and the second end region 22 of the wire rope 20, respectively, point into opposite directions. Both the first end region 21 of the wire rope 20 and the second end region 22 of the wire rope 20 are disposed parallel to the contact surface 11. The first end region 21 of the wire rope 20 and the second end region 22 of the wire rope 20 are also parallel to one another.

The first end region 21 of the wire rope 20 is disposed in a first ferrule 31 and connected thereto, and the second end region 22 of the wire rope 20 is disposed in a second ferrule 32 and connected thereto, wherein the connection to the ferrules 31, 32 can for example be a swaged connection.

The base 10 comprises a first ferrule receptacle 13, in which the first ferrule 31 and the first end region 21 of the wire rope 20 are disposed, as well as a second ferrule receptacle 14, in which the second ferrule 32 and the second end region 22 of the wire rope 20 are disposed. Both ferrule receptacles 13, 14 are open towards the flat ceiling 1 to which the base 10 is attached.

The first ferrule receptacle 13 is laterally delimited by a first fork 15, through which the wire rope 20 passes. The first fork 15 is wider than the wire rope 20 but narrower than the first ferrule 31. The first fork 15 thus forms a counter bearing which secures the first ferrule 31 and therefore the first end region 21 of the wire rope 20 to the base 10. In analogy, the second ferrule receptacle 14 is laterally delimited by a second fork 16, through which the wire rope 20 passes. The second fork 16 is wider than the wire rope 20 but narrower than the second ferrule 32. The second fork 16 thus forms a counter bearing which secures the second ferrule 32 and therefore the second end region 22 of the wire rope 20 to the base 10. A separate bolted fixing plate 40 secures the wire rope 20 in the forks 15, 16.

The base 10 has two thimble grooves 50, in which the wire rope 20 is disposed. The thimble grooves 50 guide and laterally support the wire rope 20. In particular, the thimble grooves 50 form a constriction in the base 10, in particular in the node portion 17 thereof. The thimble grooves 50 constitutes an integrated thimble for stabilizing the wire rope loop 28.

The invention claimed is:
1. A hoist point anchor, comprising:
a base, wherein the base has a contact surface for contacting a flat ceiling and wherein the base has a plurality of anchor holes emerging at the contact surface for receiving a plurality of respective anchor bolts for anchoring the base to the flat ceiling; and
a wire rope forming a wire rope loop for attaching a hook, wherein the wire rope loop winds around the base in an interlaced arrangement of the wire rope loop and the base and wherein a mechanical connection between the wire rope loop and the base is disposed within the base without a fitting that protrudes from the base.

2. The hoist point anchor according to claim 1, wherein the wire rope has a first end region and a second end region, wherein the first end region is opposite the second end region, and wherein the first end region is disposed parallel to the contact surface and the second end region is disposed parallel to the contact surface.

3. The hoist point anchor according to claim 2, further comprising a first ferrule and a second ferrule, wherein the first ferrule surrounds and is fixed to the wire rope in the first end region, wherein the second ferrule surrounds and is fixed to the wire rope in the second end region, and wherein the base engages the first ferrule and the second ferrule.

4. The hoist point anchor according to claim 3, wherein the first ferrule and the second ferrule have a respective longitudinal axis and wherein the respective longitudinal axes are parallel to each other.

5. The hoist point anchor according to claim 1, wherein the base has a node portion and a plurality of mounting arms projecting from the node portion and wherein a respective one of the plurality of anchor holes is disposed in each of the plurality of mounting arms.

6. The hoist point anchor according to claim 5, wherein the contact surface is disposed on the plurality of mounting arms.

7. The hoist point anchor according to claim 1, wherein the base has thimble grooves that guide the wire rope loop.

8. The hoist point anchor according to claim 1, wherein the base is monolithic.

9. The hoist point anchor according claim 1, wherein the base is cast metal.

10. A building structure, comprising:
a flat ceiling; and
the hoist point anchor according to claim 1 fixed to the flat ceiling by a plurality of anchor bolts respectively passing through the plurality of anchor holes such that the contact surface of the base of the hoist point anchor faces the flat ceiling.

* * * * *